United States Patent [19]

Chou et al.

[11] Patent Number: 5,580,927
[45] Date of Patent: Dec. 3, 1996

[54] IONOMERS WITH IMPROVED HIGH TEMPERATURE PROPERTIES AND IMPROVED MOLDABILITY

[75] Inventors: Richard T. Chou, Wilmington, Del.; Robert J. Statz, Kennett Square, Pa.

[73] Assignee: E. I. Du Pont de Nemours and Company, Wilmington, Del.

[21] Appl. No.: 537,189

[22] Filed: Sep. 29, 1995

[51] Int. Cl.⁶ .............................. C08L 33/02; C08L 43/00
[52] U.S. Cl. ................................... 525/201; 526/216
[58] Field of Search ............................ 525/201; 526/216

[56] References Cited

U.S. PATENT DOCUMENTS

| | | | |
|---|---|---|---|
| 3,264,272 | 8/1966 | Rees | 525/201 X |
| 4,248,990 | 2/1981 | Pieski et al. | 526/317 |
| 5,028,674 | 7/1991 | Hatch | 526/216 |
| 5,397,840 | 3/1995 | Sullivan et al. | 525/221 |

Primary Examiner—Irina Zemel
Attorney, Agent, or Firm—Peter A. Fowell

[57] ABSTRACT

New Ionomer compositions which have improved moldability and improved high temperature behavior are based on ionomer polymerized at normal pressures but lower than normal temperatures. The compositions may be blends with standard ionomer, particularly if the low-temperature-prepared ionomer is prepared at very low temperatures which reduces productivity compared with standard ionomer, or useful alone when prepared at intermediate temperatures.

2 Claims, No Drawings

5,580,927

IONOMERS WITH IMPROVED HIGH TEMPERATURE PROPERTIES AND IMPROVED MOLDABILITY

BACKGROUND OF THE INVENTION

1. Field of the Invention

This invention relates to ionomer compositions having improved high temperature utility and improved moldability compared with standard ionomers of comparable comonomer composition. The ionomer compositions are prepared from acid copolymers polymerized at lower than normal temperatures but at normal pressures. The ionomer compositions may be either blends of ionomer prepared at moderate to very low temperatures with standard ionomer, or ionomer prepared at moderately low temperatures.

2. Description of Related Art

Copolymers of ethylene and an unsaturated carboxylic acid such as (meth)acrylic acid, optionally with another comonomer, and their derived ionomers are well known. These copolymers typically contain at least 50 weight percent and up to about 95 weight percent ethylene. Not unexpectedly, they have some characteristics which reflect crystallinity somewhat similar to that of polyethylene. The polar acid groups in such acid copolymers lead to differences from, and certain advantages, as well as some disadvantages compared with polyethylene itself. When the acid copolymers are neutralized, the resulting ionomers contain ionic bonds which lead to an additional difference, and some advantages over the acid copolymer itself. Ionomers contain effective crosslinking at use temperatures, yet thermoplastic processibility at melt temperatures. Ionomer properties thus display characteristics which reflect a crosslinked nature, and an ionic nature. Ionomers have higher tensile strength, greater clarity, better abrasion resistance and higher stiffness than acid copolymers with comparable melt index (MI) and comonomer level.

The higher the acid level, the higher the degree of ionic character possible, since there are more acid groups to be neutralized with metal cations. Higher levels of neutralization will increase ionic character for a given acid level. Neutralization increases molecular weight (particularly weight-average rather than the underlying number-average chain length) and viscosity. MI decreases on neutralization. Thus the acid copolymers used to make ionomers are polymerized to a much lower molecular weight (higher MI) than typical for acid copolymers (other than those for adhesive use where high MI is the norm), and then neutralized to higher molecular weight (lower MI) via ionic crosslinking. The molecular weight required to achieve good mechanical properties in ionomers is thus achieved, in part, by 'ionic' crosslinking rather than by increasing degree of polymerization of linear chains per se. For acid copolymers of given comonomer composition, (i.e., un-neutralized), property improvements come from increasing degree of polymerization The interspersed copolymerized acid units, however, modify and may reduce the level of crystallinity compared with polyethylene and, unfortunately, reduce the melting point and upper use temperature to well below that of polyethylene itself. Neutralization generally further reduces the freezing point somewhat and may reduce the amount of crystallinity. Increasing the use temperature of ionomeric copolymers, while maintaining their essential ionomer character, has become a holy grail.

Typical commercial ionomers, such as those sold under the trade name Surlyn® by E. I. du Pont de Nemours and Company, derive from acid copolymers with about 9 to 20 weight percent (meth)acrylic acid comonomer. As normally prepared, both the acid copolymers and their derived ionomers have differential scanning calorimetry (DSC) melting points which are in the region of about 81° to about 96° C., and freezing points in the region of about 40° to about 60° C., depending on the comonomers and amounts of these present. These ranges are considerably below that of low density (branched) polyethylene which is prepared under generally comparable conditions. Such polyethylene for instance, typically has a melting point of about 115° C. as well as a higher freezing point than ionomers. For many uses it would be desirable to increase the melting and freezing point of any particular ionomer in order to maintain mechanical properties to a higher temperature, and to increase the rate of crystallization on cooling respectively. Increasing freezing point and hence crystallization rate can improve certain aspects of melt processability.

U.S. Pat. No. 4,248,990 (Pieski), discloses that the polymerization pressure and temperature both have a strong effect on the stiffness of acid copolymers. Pieski considered polymerization at low pressure using 'normal' temperatures, and at low temperature using 'normal' (high) pressures alternative options to producing the stiffer polymers of his invention. When low polymerization temperature alone, i.e., at 'normal' (high) pressures, was used the Vicat Softening temperature, stiffness, and tensile yield strength increased dramatically for acid copolymers with about 9 to 15 weight percent methacrylic acid, when polymerization temperature was decreased from 250° to 160° C. The increased softening temperature corresponds to an increase in the melting points. This increased temperature was attributed to a change in the randomness of the acid and ethylene groups along the polymer chain. At the same acid level, an increase in the number of acid diads and triads occurs. This results in less break up of the polyethyene sequences in the polymer for a given acid level, and a higher melting point, nearer that of polyethylene.

Pieski discloses, and his data show, that as an alternative to low temperature/normal pressure polymerization, low pressure/normal temperature polymerization also produces more diads and triads. He considered the two different polymerization conditions to be alternative modes of producing polymer of his invention. Temperatures considered suitable to produce the required level of diads for his improved polymers (44 percent of acid as diads) at normal pressures of about 24,000 psi, were 150° to 175° C., but not above, for methacrylic acid and below 140° C. for acrylic acid.

However, low temperature and low pressure may not at all be equivalent alternatives. Based on analogy with polyethylene polymerization, at lower polymerization temperatures, less short chain branching occurs, and this also contributes to higher crystallinity and higher melting point. By contrast, polymerization at low pressure at normal temperatures produces higher levels of short chain branching and hence lower crystallinity—just the opposite of what is required for high temperature behavior. Interestingly, Pieski's data show only slightly higher stiffness for low pressure polymerization, and softening temperature data are entirely absent. Nevertheless, Pieski appears to consider the two modes equivalent. In contrast to Pieski's theories of the all importance of sequence distribution, as a result of the present invention, it is now believed that low branching is at least equally, and probably more important. As a result, the low pressure polymerization mode of Pieski is specifically excluded in the present invention.

There is a very significant decrease in polymer productivity when employing low temperature polymerization. Heat evolved from the polymerization, which will be proportional to the polymerization rate, will determine polymerization temperature for a given monomer feed temperature, when polymerization is run, as it typically is, under largely adiabatic conditions. The temperature difference between feed and polymerization temperature will thus be a measure of polymerization rate. Thus, very generally, for a 40° C. feed, productivity can be reduced to only 135/210 of that for normal polymerization, which is a reduction of about 34 percent, when the polymerization temperature is reduced from 250° to 175° C. Pieski's maximum temperature of about 175° C. represents a restriction which corresponds to a rather uneconomical process relative to that for normal polymerization.

A further problem with low temperature polymerization of acid copolymers is that phase separation of monomer and polymer can occur. Normal polymerization conditions of high pressure and high temperature allow polymerization in one phase. Phase separation is also more acute at higher acid levels, even at normal polymerization temperatures, but particularly at low polymerization temperatures. When phase separation occurs, non-uniform polymerization results.

The concept of blending a low melting point resin with a high melting point resin is well known. Blends of standard ionomers, with their low melting point, with polyethylene with its much higher melting point, are however somewhat incompatible and as a result have certain poorer properties including lower melt strength and loss of clarity. While commercial compositions which are blends of ionomer and a major portion of polyethylene (high density) do exist, their properties are substantially different from those being sought here, which are essentially those of a pure ionomer.

Blending different ionomers or ionomers with acid copolymers is also well known, and for typical copolymers which have acid levels of 9 weight percent and above, incompatibility is not a problem. In addition, ions are believed to be significantly labile so that, even when ionomers have different ions, different acid levels, different acid monomers, and even third monomers, as well as different levels of neutralization, all ions present will become essentially randomly distributed and associated will all acid groups present in the blend. The ions will be fairly randomly distributed throughout the mix of (chemically) differing underlying polymer chains.

Ionomer blending has taken on particular importance in certain end uses such as golf ball materials. Thus, U.S. Pat. No. 5,397,840 (Sullivan et al.) discloses blends of ionomers and acid copolymers for golf ball cover materials. Many similar patents disclose ionomer blends. However, in all these cases, there is no disclosure of blends where the acid copolymers, from which the ionomer components are derived, are prepared under vastly different polymerization conditions.

There is a need for ionomer compositions which maintain properties to even modestly higher temperature levels, and have improved processability characteristics, yet which can be prepared without undue sacrifice in productivity.

SUMMARY OF THE INVENTION

The invention depends on the recognition that polymerization of acid copolymers, which form the base resin for ionomers, at lower temperatures but not lower pressures than used for standard acid copolymer can produce copolymers and derived ionomers with improved high temperature properties and processability. Loss of productivity may be reduced by employing blends of polymer produced at as low as 150° C. with polymer produced at greater than 200° C. Alternatively, an advantage can be obtained without a major loss in productivity by employing only moderately reduced polymerization temperatures, in the range of from above 175° to about 200° C.

Specifically, the ionomer composition may be a blend of two ionomers, the first ionomer being prepared from a first ethylene/carboxylic acid copolymer having from 9 to 25 weight percent acrylic or methacrylic acid, and optionally up to 40 weight percent alkyl acrylate or methacrylate whose alkyl group has from 1 to 8 carbon atoms, polymerized at between 150° and 200° C., at from 23,000 to 30,000 psi, the first acid copolymer having a melt index of 20 to 300 g/10 min., and the derived first ionomer produced by partially neutralizing from 10 to 65 percent of the acid groups of the first acid copolymer with sodium, zinc, lithium or magnesium ions, the first ionomer having an MI of from 0.1 to 30 g/10 min., and being present in the blend at a level of at least 10 weight percent, the second ionomer being prepared from a second ethylene/carboxylic acid copolymer having from 9 to 25 weight percent of acrylic or methacrylic acid, optionally containing an alkyl acrylate or methacrylate whose alkyl group has from 1 to 8 carbon atoms, polymerized at between 200° and 270° C. and at from 23,000 to 30,000 psi, the second acid copolymer having a melt index of 20 to 80 g/10 min. the derived second ionomer produced by partially neutralizing from 10 to 65 percent of the acid groups of the second acid copolymer with sodium, zinc lithium or magnesium ions, the second ionomer having an MI of from 0.1 to 30 g/10 minutes, the ionomer blend composition having from 25 to 65 percent of the acid groups neutralized, and its MI being from 0.1 to about 7.0 g/10 min.

Alternatively, the invention is to an ionomer composition which is prepared from a third ethylene/carboxylic acid copolymer having from 9 to 25 weight percent acrylic or methacrylic acid, optionally with up to 40 weight percent of an alkyl acrylate or methacrylate whose alkyl group has from 1 to 8 carbon atoms, polymerized at between 175° and about 200° C. and at from 23,000 to 30,000 psi, the acid copolymer having a melt index of from 20 to 300 g/10 minutes, the derived ionomer produced by partially neutralizing from 25 to 65 percent of the acid groups present with sodium, zinc, lithium or magnesium ions, the ionomer having an MI of from 0.1 to 7 g/10 min.

DETAILED DESCRIPTION OF THE INVENTION

In this disclosure, the term 'copolymer' means a polymer derived from two or more monomers. 'Dipolymers' and 'terpolymers' are copolymers with two and three monomers respectively. The term 'direct copolymer' means a copolymer where the monomers are polymerized together, producing polymer with quasi-random sequence distribution of monomers along the chain, but in accord with the monomer reactivities at the polymerization temperature. This is in contrast to 'graft' copolymers where one or more 'comonomers' may be grafted onto a main chain polymer, the comonomer thus producing long sequences of units.

Methods of preparing acid copolymers and ionomers are well known. Acid copolymers may be prepared by the method disclosed in U.S. Pat. No. 4,351,931 (Armitage). This patent describes polymers with up to 90 weight percent ethylene, the rest being a carboxylic acid. This represents a general procedure for preparation of all acid copolymers within the bounds of this invention.

U.S. Pat. No. 5,028,674 (Hatch et al.) discloses improved methods of polymerizing such copolymers when polar monomers such as acrylic and methacrylic acid are incorporated particularly at a level of higher than 10 weight percent.

U.S. Pat. No. 4,248,990 (Pieski) describes preparation and properties of acid copolymers at low polymerization temperatures and normal temperatures, as well as low pressures and normal temperatures. The latter low pressure conditions are not used for the polymers of the present invention. Preparation is exemplified by Pieski when the polymerization temperature is as low as 160° C. but also up to 250° C. at normal pressures. The conditions of low temperature and normal pressure covers conditions suitable for preparation of polymers of the present invention. All the above three patents are hereby incorporated by reference.

The preparation of ionomers from acid copolymers is disclosed in U.S. Pat. No. 3,264,272 (Rees). This is a broad disclosure describing preparation when the starting MI is down to as high as 1000 g/10 minutes, and the finishing MI may be as low as about 0.1. It embraces the preparation of all ionomers of this invention. The patent is hereby incorporated by reference.

When the composition of the invention is a single ionomer, i.e., not a blend with standard ionomer, it is an ionomer produced from a direct ethylene/carboxylic acid copolymer having from 9 to 25 weight percent acrylic or methacrylic acid comonomer, optionally with up to 40 weight percent of an alkyl acrylate or methacrylate whose alkyl group has from 1 to 8 carbon atoms. It is polymerized at lower than 'normal' polymerization temperatures, by which is meant below 200° C., but not below 175° C., and at 'normal' pressures, meaning pressures ranging from 23,000 to 30,000 psi. The direct acid copolymer can have an MI of from 20 to 300 g/10 minutes, preferably 20 to 200 g/10 minutes. The neutralization level on converting to ionomer should be above 25 percent but not above 65 percent, and the final MI should be between 0.1 and 7.0 g/10 min. Generally, in the past, ionomers were made by neutralizing an acid copolymer of MI in the 20 to 80 g/10 minute region. Above about 80 MI, higher levels of neutralization are required to achieve comparable finishing MI in the ionomer, and these higher levels of neutralization can compensate to some extent for the lower molecular weight of high MI starting acid copolymer.

If polymerization temperature is below 175° C., there will be an excessive decrease in productivity. While such polymers have higher melting points than those of the present invention, those polymers produced between 175° and 200° C. will still have a higher melting point than 'standard' ionomers, and still provide an advantage in high temperature utility and processability without excessive productivity loss.

The melting and freezing points of ionomer compositions will vary depending on the amount of carboxylic acid, any other comonomer present, and also on the degree of neutralization. Different compositions with regard to comonomers and ion type are required for different particular applications. However, given a particular composition with defined comonomers, comonomer levels and neutralizing ion and amount, the advantage of the present invention will be that the utility of the particular composition can be maintained, yet there will be a moderate processing advantage and also a moderate improvement in high temperature utility. For instance, for certain uses, a third 'softening' comonomer, usually an alkyl acrylate is present in ionomers. Such a comonomer can improve low temperature properties. While it will not have the stiffness and high melting point of ionomers with no softening monomer, polymerization according to the conditions specified for the present invention will still provide an advantage over the same composition polymer but which is polymerized under normal polymerization conditions.

Acid copolymers and their derived ionomers having levels of acid below 9 weight percent will have even higher melting points. However, ionomers derived from such acid copolymers will have less ionomer character, and, while viable compositions, are outside the present invention. Such low acid polymers blended with polymers having a higher, more typical acid level can result in blends with increased haze levels.

An alternative to polymerization at intermediate temperature levels, outside the range disclosed by Pieski, depends on the recognition that on blending ionomers, an ionomer with a high melting point can increase, and even have a dominant effect on the overall crystallization behavior as it affects melt processability if it is present in sufficient quantity. That is to say the net melting point in a blend is not necessarily just a weighted average of component melting points, in that the higher melting component does, to some extent, manifest itself independently of the lower melting component, particularly as the level of the higher melting point ionomer increases. At about 30 percent high melting ionomer, two distinct melting peaks can be observed in DSC.

Thus it is possible to advantageously utilize polymer polymerized at very low, but relatively uneconomical temperatures/normal pressures, provided the polymer is only a portion of the overall composition. For effectiveness, as well as economy, the low temperature ionomer should be at least 10 percent, preferably above 25 percent of the blend ionomer composition. The rest can be normal ionomer produced under much more economical conditions. The overall economy will be a function of the amount of each component in a blend. The blend should have at least 30 weight percent of normal ionomer.

In the blends of this invention, the higher melting acid copolymer component from which higher melting ionomer is derived may be polymerized at temperatures between 150° and 200° C. at pressures above 23,000 psi. up to 30,000 psi., preferably at 25,000 psi or above. It can have an MI of from 20 to 300 g/10 min., preferably 20 to 200 g/10 minutes. On neutralization it should have an MI of from 0.1 to 30.0 g/10 min. The level of neutralization can be from 10 to 65 percent. Preferably it is below about 40 percent.

The 'standard' or 'normal' ionomer blend component is produced from an acid copolymer polymerized at a polymerization temperature of from 200° to 270° C., but preferably above 220° C., at pressures of from 23,000 to 30,000 psi. The MI of the acid copolymer used to prepare the standard ionomer is from 20 to 80 g/10 min. Recently ionomers have been made from acid copolymer with higher than 80 MI. However, such ionomers are not part of the present invention. In forming the ionomer, from 10 to 65 percent of the acid groups are neutralized to a final MI of from 0.1 to 30.0 g/10 min. The blend should have an MI of from 0.1 to 7.0 g/10 min. This means that if one component has a high MI of, say, 30 g/10 min. there should be sufficient low MI second component to reduce the final MI to no more than 7.0 g/10 minute.

Because blending averages out the level of neutralization, (as well as MI) it is possible to blend an ionomer having a relatively low level of neutralization, such as 10 percent, with one with a higher level of neutralization provided the overall level of neutralization is above about 25 percent, but less than 65 percent. If the overall level of neutralization is below 25 percent, there will be insufficient ionomer character. Above 65 percent neutralization, there is a considerable reduction in the melting and freezing point advantage. While maximum ionomer character is desirable, there will be a balance between increasing neutralization level to achieve such ionomer character, and keeping it lower to prevent undue reduction in melting and freezing points. Preferably, the overall level of neutralization is below 40 percent.

TEST PROCEDURES

Melting point, as determined by DSC, is determined as follows. The material is first heated to above its melting point, and to at least 120° C., after which it is cooled in a controlled way, at 10° C./minute to provide a controlled morphology. It is then heated at 10° C./minute. The melting point is the value of the highest temperature peak if there is more than one peak (ionomers generally show two peaks). A cooling exotherm temperature peak, cooling at 10° C./minute is also determined, as the maximum point on the cooling curve peak. If a second peak, at lower temperatures occurs, it is noted, and shown in Table 1. Heat of fusion on heating and crystallization on cooling are calculated as the area under the curves, using a base line from initial melting or freezing to final melting or freezing.

In addition to DSC measurements, the isothermal crystallization rate was measured to correlate to molding cycle times. The sample was heated up to melt, and quenched to various test temperatures. Then, under isothermal conditions, time to reach the exotherm peak, which corresponds to roughly half the total level of crystallinity which it will finally attain, is measured. The temperature at which this time is one minute is referred to as Tc-½.

Melt Index, MI, is determined using ASTM D-1238, condition E, using a 2160 gram weight.

EXAMPLES

Table 1 shows various thermal data, determined as described under 'test procedures'. The various compositions are given a reference number for convenience. The Code refers to the composition type. Thus the prefix I is for a single ionomer composition. The prefix A is for an acid copolymer, and the prefix B is for a blend ionomer composition.

The melting point, Tm, gives a guide to the temperature at which mechanical properties such as tensile behavior and creep will drop off. Any increase in melting point can be regarded as indicating at least some improvement in these properties, and a large increase in Tm will indicate a more significant improvement in these properties.

The freezing point, and heat of crystallization will indicate how rapidly, and how much, crystallization can occur. The measure Tc-½, which, as noted above, measures the temperature at which approximately half the possible crystallization occurs in one minute, gives an indication of how quickly a part will freeze in a mold, and thus a rough guide to the effect on molding cycle to the extent that molding cycle is affected by the rate at which polymer freezes and can be removed from the mold. The overall molding cycle will affect the economics of processability. Molding cycle is, of course, also affected by the melt rheology of the resin.

It can be seen from melting points and freezing points, first that increased acid comonomer level decreases freezing and melting points (compare reference number 1 and 3 for resins polymerized at normal temperatures). However, reducing temperature of polymerization to 170° C. dramatically increases melting point and freezing point in acid copolymer and ionomer neutralized to about 30 percent. At 60 percent neutralization, melting point is still maintained, freezing point is still higher, but reduced somewhat compared to 30% neutralization, as is heat of fusion (compare reference numbers 2,3 7 and 8). Temperature of 1 minute crystallization time (Tc-½) increases significantly, to 91° C. for 30% neutralized ionomer, and even still significantly for 60% neutralized ionomer, from about 57° to 70°–76° C.

The increases in all values of the various thermal properties are so significant, particularly Tc-½, that even at intermediate temperatures of polymerization, of 175° to 200° C., there will still be a substantial increase in these values. This will result in at least some improvement in processability, but without the major productivity loss of polymerizing at much lower temperatures.

Reference samples 9, 10 and 11 are blends of standard ionomer and ionomer polymerized at 170° C. The standard ionomer, I4 has a freezing point of 49° C. On blending with just 10% low-temperature ionomer I5 (30% neutralized), freezing point increases to 56° C. With 10% of the same base resin ionomer but 60% neutralized, the temperature increase is less, suggesting lower levels of neutralization are preferred as blend components. As noted above, the ionomer with 30% neutralization has a significantly higher crystallization temperature alone. When 30 percent of this ionomer is used in a blend with standard ionomer, two peaks are seen in a cooling DSC. One is at the actual melting point of the low temperature ionomer. Thus at this higher blend level, the melting point of the ionomer is not averaged out by the standard ionomer, but appears to crystallize at its own melting point. Thus, the presence of a moderate amount of low temperature ionomer can cause freezing to be initiated at the higher crystallization point of the low-temperature ionomer.

TABLE 1

THERMAL BEHAVIOR OR VARIOUS INONOMERS AND BLENDS

| Ref# | Code | Blend Wt. Ratio | Comp, Wt. % | % Neut: Ion | MIb/MI | Poly Temp | Tm | Tc | Heat Xryst. | Tc-1/2 |
|---|---|---|---|---|---|---|---|---|---|---|
| 1 | I1 | — | E/MAA; 90/10 | 59; Na | 35/1.3 | 230–255 | 95 | 59 | 57 | 67 |
| 2 | I2 | — | E/MAA; 85/15 | 40; Na | 60/1.7 | 230–255 | 88 | 50 | 38 | 58 |
| 3 | I3 | — | E/MAA; 85/15 | 59; Na | 60/0.9 | 230–255 | 88 | 47 | 30 | 56 |
| 4 | I4 | — | E/MAA; 85/15 | 59; Zn | 60/0.7 | | | 49 | | |
| 6 | A1 | — | E/MAA; 85/15 | 0 | 110 | 170 | 103 | 82 | 85 | — |
| 7 | I5 | — | E/MAA; 85/15 | 30; Na | 110/15 | 170 | 103 | 81 | 76 | 91 |
| 8 | I6 | — | E/MAA; 85/15 | 60; Na | 110/2 | 170 | 101 | 61 | 36 | 70–76 |
| 9 | B1 | 90/10; I4/I5 | see blend ingr. | | | | | 56 | | |
| 10 | B2 | 90/10; I4/I6 | see blend ingr. | | | | | 53 | | |
| 11 | B3 | 70/30; I4/I6 | see blend ingr. | | | | | 62/52 | | |

Poly Temp = Polymerization Temperature. MIb = melt index of acid copolymer base resin; MI = melt index of ionomer.
Tm is peak melting point; Tc is peak freezing point; Heat Xryst. is heat of crystallization in Joules/gram
Tc-1/2 time is Temperature where crystallization reaches half completion if one minute.
All resins polymerized at 27 kpsi. All temperatures in degrees C.

We claim:

1. An ionomer composition which is a blend of two ionomers, the first ionomer being prepared from a first ethylene/carboxylic acid copolymer having from 9 to 25 weight percent acrylic or methacrylic acid, and optionally up to 40 weight percent of an alkyl acrylate or methacrylate whose alkyl group has from 1 to 8 carbon atoms, polymerized at a temperature between 150° and 200° C., and at a pressure of from 23,000 to 30,000 psi, the first acid copolymer having a melt index of 20 to 300 g/10 min., and the derived first ionomer produced by partially neutralizing from 10 to 65 percent of the acid groups of the first acid copolymer with sodium, zinc, lithium or magnesium ions, the first ionomer having an MI of from 0.1 to 30 g/10 min., and being present in the blend at a level of above 25 weight percent, the second ionomer being prepared from a second ethylene/carboxylic acid copolymer having from 9 to 25 weight percent of acrylic or methacrylic acid, optionally containing an alkyl acrylate or methacrylate whose alkyl group has from 1 to 8 carbon atoms, polymerized at a temperature between above 220° and 270° C. and at a pressure of from 23,000 to 30,000 psi, the second acid copolymer having a melt index of 20 to 80 g/10 min. the derived second ionomer produced by partially neutralizing from 10 to 65 percent of the acid groups of the second acid copolymer with sodium, zinc lithium or magnesium ions, the second ionomer having an MI of from 0.1 to 30 g/10 min.

the ionomer blend composition being from 25 to 65 percent neutralized, and its MI being from 0.1 to about 7.0 g/10 min.

2. The ionomer composition of claim 1, wherein the first acid copolymer is polymerized at a pressure of at least 25,000 psi, has an MI of no more than 200 g/10 minutes, and where the overall level of neutralization in the ionomer composition is below 40 percent.

* * * * *